United States Patent [19]

Takenaka et al.

[11] Patent Number: 4,977,447

[45] Date of Patent: Dec. 11, 1990

[54] COLOR CATHODE RAY TUBE

[75] Inventors: Shigeo Takenaka; Eiji Kamohara; Takashi Nishimura, all of Fukaya, Japan

[73] Assignee: Kabushiki Kaisha Toshiba, Kawasaki, Japan

[21] Appl. No.: 399,443

[22] Filed: Aug. 28, 1989

Related U.S. Application Data

[63] Continuation of Ser. No. 312,313, Feb. 17, 1989, abandoned, which is a continuation of Ser. No. 214,871, Jun. 22, 1988, abandoned, which is a continuation of Ser. No. 853,763, Apr. 18, 1986, abandoned.

[30] Foreign Application Priority Data

Apr. 19, 1985 [JP] Japan ............................... 60-82567
May 13, 1985 [JP] Japan ............................... 60-99615

[51] Int. Cl.$^5$ .............................................. H01J 29/50
[52] U.S. Cl. ................................ 358/66; 358/71; 358/64; 315/368; 315/375
[58] Field of Search ................ 358/64, 66, 71; 315/368, 375

[56] References Cited

U.S. PATENT DOCUMENTS

| | | | |
|---|---|---|---|
| 2,611,099 | 9/1952 | Jenny | 358/66 |
| 2,672,575 | 3/1954 | Werenfels | 315/375 |
| 2,688,048 | 8/1954 | Rose | 358/71 |
| 2,764,628 | 9/1956 | Bambara | 358/65 |
| 2,922,073 | 1/1960 | Oestreicher | 358/71 |
| 2,972,014 | 2/1961 | Welch | 358/71 |
| 2,972,659 | 2/1961 | Sziklai | 358/71 |
| 2,976,351 | 3/1961 | Loughlin | 358/71 |
| 2,977,408 | 3/1961 | Welch | 358/71 |
| 3,638,065 | 1/1972 | Ueno | 358/71 |
| 3,671,896 | 6/1972 | Torsch | 335/213 |
| 3,952,227 | 4/1976 | Van alphen | 315/382 |

FOREIGN PATENT DOCUMENTS

| | | | |
|---|---|---|---|
| 59-89093 | 5/1984 | Japan . | |
| 60-12652 | 1/1985 | Japan . | |
| 623269 | 9/1978 | U.S.S.R. | 358/66 |
| 693710 | 7/1953 | United Kingdom | 358/71 |

*Primary Examiner*—James J. Groody
*Assistant Examiner*—Mark R. Powell
*Attorney, Agent, or Firm*—Cushman, Darby & Cushman

[57] ABSTRACT

A color cathode ray tube (CRT) arrangement utilizing only a single electron gun. A single electron beam, emitted from the single gun, is deflected in such a manner as to simulate the three electron beams that would normally be provided by three separate electron guns in a conventional CRT arrangement. The single electron beam is electrostatically deflected by electrodes according to a three stage cycle to simulate three electron beams directed in different directions. The simulated electron beams are deflected by a supplemental coil to correct for convergence error. The three electron beams are deflected by the main deflection coils of the tube's yoke and then pass through apertures of the tube's shadow mask to impinge on phosphor stripes of a screen formed on a face plate of the tube.

37 Claims, 6 Drawing Sheets

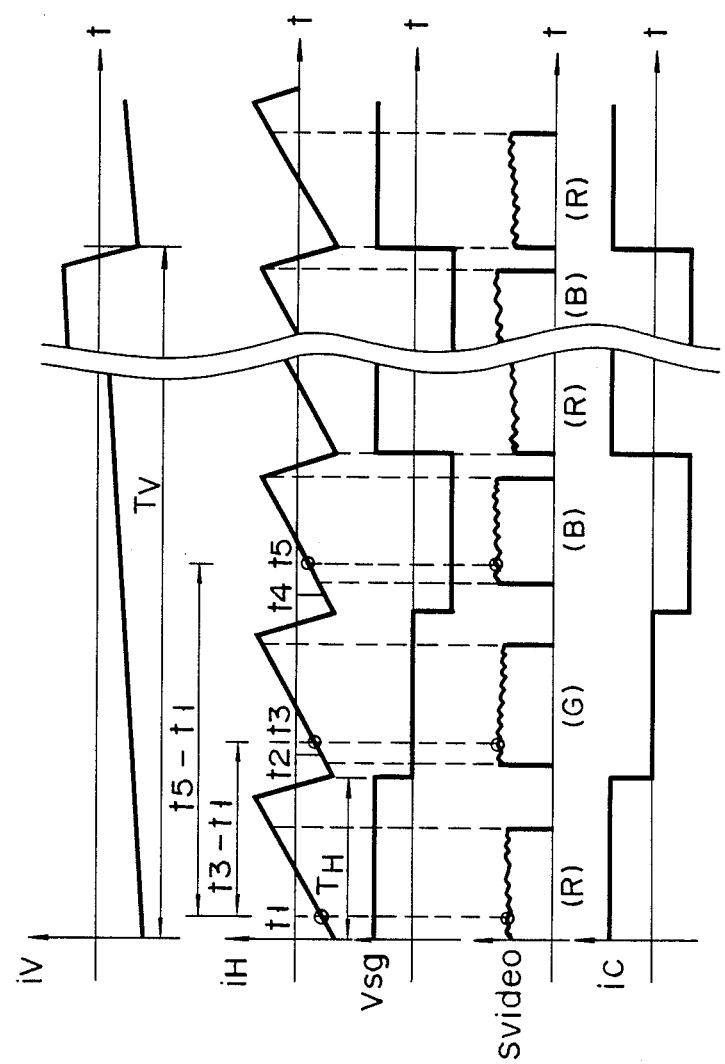

F I G. 7A
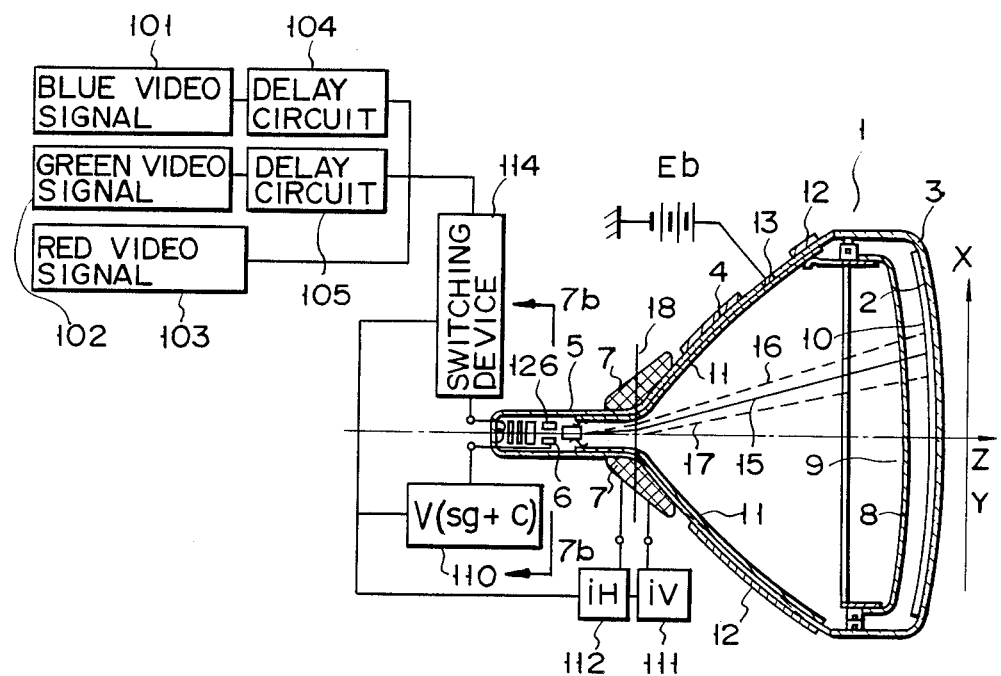
F I G. 7B
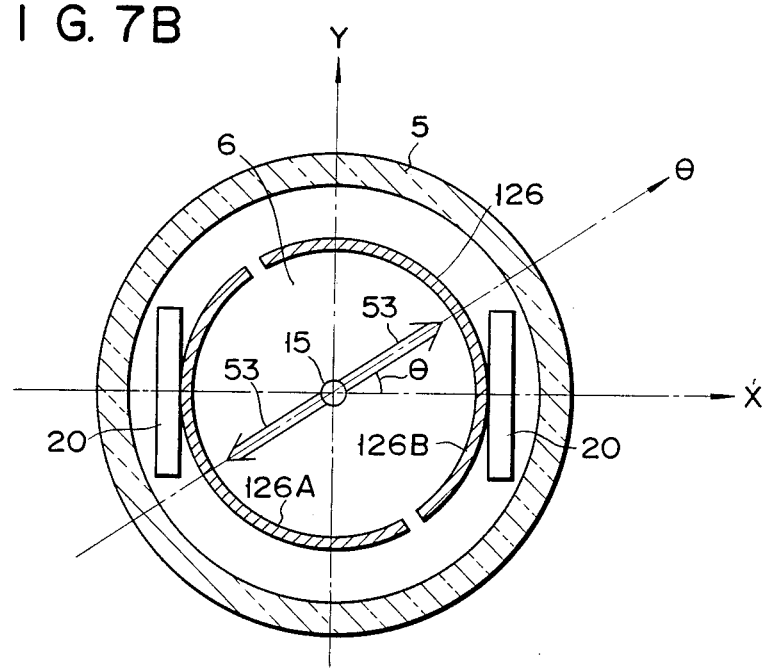

COLOR CATHODE RAY TUBE

This is a continuation of Application No. 07/312,313, filed Feb. 17, 1989, now abandoned; which is a continuation application of 07/214,871, filed Apr. 18, 1986, now abandoned.

BACKGROUND OF THE INVENTION

The present invention relates to a color cathode ray tube and, more particularly, to a color cathode ray tube of a shadow mask type for reproducing a color image with a single electron beam.

In a conventional color cathode ray tube, three electron guns are arranged in an in-line- or delta-type electron gun assembly. Electron beams emitted from the respective electron guns are accelerated and converged on a phosphor screen. These electron beams are incident at slightly different predetermined angles on slit apertures of a shadow mask arranged facing the phosphor screen. The electron beams pass through the slit apertures and land on corresponding phosphor stripes, which then emit corresponding color rays. The three electron beams are deflected throughout the entire surface of the screen by a magnetic field generated by a deflection yoke. Therefore, the phosphor screen is scanned with the electron beams. A video signal is applied to the control electrodes of the three electron guns in synchronism with the deflection and scanning of the electron beams, thereby reproducing a corresponding image on the screen.

In a conventional color cathode ray tube of this type, three electron beams must be accurately converged on the front surface of the screen. At the same time, reproduced image distortions such as raster distortion and beam spot distortion caused by electron beam deflection must be eliminated. It is difficult to design a deflection yoke which satisfies the above requirements. In designing a deflection yoke for obtaining good convergence and eliminating distortion, precision depends on the distances between the three electron beams incident on the deflection plane defined by the deflection yoke. The smaller the distances, the easier the design of the deflection yoke. In particular, beam spot distortion can be sufficiently eliminated.

In order to improve resolution, the beam spot size on the screen must be minimized. For this reason, electron lens apertures of the respective electron guns must be maximized.

However, it is impossible to provide both a decrease in distances between the electron beams and an increase in apertures of electron lenses, i.e., the electrode openings of the electron guns.

In a conventional index color cathode ray tube for reproducing a color image with a single electron beam, the electron beam must be converged to form an extremely small beam spot on the screen. Color switching frequencies are high, and the circuit arrangement is complicated. Therefore, such cathode ray tubes are not now widely used.

One proposal was made prior to the widespread application of the current type of color cathode ray tube. According to this scheme, a single electron beam is slightly deflected before the beam reaches the center of deflection. A video signal is switched on the basis of this small deflection, so that three electron beams seem to appear.

According to this system, only one electron beam is required, so the aperture of the electron lens of the electron gun can be increased. However, it is difficult to accurately align the three electron beams on the screen.

In order to solve this problem, U.S. Pat. No. 2,764,628 describes a method for changing the relative relationship between the video signal and the deflection signal to register tricolor images. However, in a system which reproduces each color image with one horizontal scanning, the prior art method cannot completely register tricolor reproduced images.

SUMMARY OF THE INVENTION

It is an object of the present invention to provide a color cathode ray tube wherein an electrode opening diameter of an electron gun can be sufficiently increased, distances between electron beams entering a deflection plane can be decreased, and a color image having high resolution and good convergence can be reproduced.

According to an aspect of the present invention, there is provided a color cathode ray tube, comprising:
a vacuum envelope with a faceplate;
an electron gun arranged in the vacuum envelope in a position facing the faceplate and including a cathode for emitting a single electron beam and electrode means for accelerating and converging the electron beam;
a screen formed on the faceplate and including phosphor elements for emitting different colored light rays upon landing of the electron beam;
a shadow mask, arranged inside the vacuum envelope in a position facing the screen, for selecting the electron beam emitted from the electron gun and directed toward the screen, and for causing the electron beam to land on a predetermined one of the phosphor elements;
auxiliary deflecting means, arranged around or near an envelope portion at which the electron gun is arranged, for giving a first small deflection having a plurality of stages to the electron beam in a predetermined cycle and a second small deflection having a plurality of stages to the electron beam in the predetermined cycle, the first small deflection of each stage having a direction different from that of the second small deflection;
main deflecting means, arranged around the vacuum envelope, for vertically deflecting a small deflected electron beam within a predetermined duration and horizontally deflecting a vertically deflected electron beam within a time segment of the predetermined duration in synchronism with the cycles of the small deflections;
means for generating video signals corresponding to respective colors;
means for providing a time difference corresponding to the small deflection of each stage in a duration of the video signals; and
means for sequentially applying the video signals provided with the time differences to the electron gun and reproducing the video signals by the small deflection of each stage.

According to another aspect of the present invention, there is provided a color cathode ray tube, comprising:
a vacuum envelope with a faceplate;
an electron gun arranged in the vacuum envelope in a position facing the faceplate and including a cathode for emitting a single electron beam and electrode means for accelerating and converging the electron beam;

a screen formed on the faceplate and including phosphor elements for emitting different colored light rays upon landing of the electron beam;

a shadow mask, arranged inside the vacuum envelope in a position facing the screen, for selecting the electron beam emitted from the electron gun and directed toward the screen, and for causing the electron beam to land on a predetermined one of the phosphor elements;

auxiliary deflecting means, arranged around or near an envelope portion at which the electron gun is arranged, for giving a first small deflection having a plurality of stages to the electron beam in a predetermined cycle and a second small deflection having a plurality of stages to the electron beam in a predetermined cycle, the first small deflection of each stage having a direction different from that of the second small deflection;

means for generating video signals corresponding to respective colors;

means for providing a predetermined time difference between the video signals;

means for sequentially applying the video signals provided with the time differences to the electron gun and reproducing the video signals by the small deflection of each stage; and main deflecting means, arranged around the vacuum envelope, for vertically deflecting a small deflected electron beam within a predetermined duration and horizontally deflecting a vertically deflected electron beam within a time segment of the predetermined duration in synchronism with the cycles of the small deflections.

BRIEF DESCRIPTION OF THE DRAWINGS

FIGS. 5A to 5E are timing charts of signals supplied to the respective components of the color cathode ray tube of FIG. 1;

FIG. 7A is a schematic view of a color cathode ray tube according to still another embodiment of the present invention;

FIGS. 7B is a sectional view of the color cathode ray tube in FIG. 7A taken along the line VII—VII thereof.

DETAILED DESCRIPTION OF THE PREFERRED EMBODIMENTS

Figure 1:
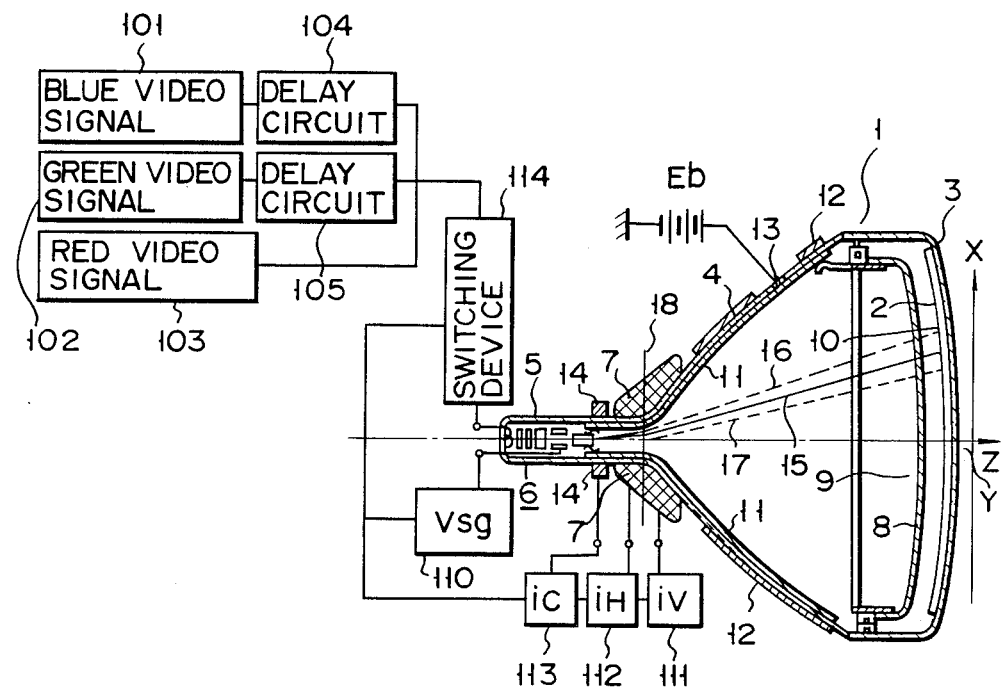
FIG. 1 is a schematic view of a color cathode ray tube according to an embodiment of the present invention.

FIG. 1 shows a color cathode ray tube according to an embodiment of the present invention. A vacuum envelope of color cathode ray tube 1 includes panel 3 with a faceplate, funnel 4 contiguous with the skirt of panel 3, and neck 5 contiguous with funnel 4. A phosphor screen 2 is defined by forming a large number of element groups of red, blue, and green phosphor stripes 10 on the inner surface of the faceplate of panel 3. Metal backing is formed on the phosphor screen to constitute screen 2. Shadow mask 9, having a large number of slit apertures at a predetermined pitch, is supported by the skirt of panel 3 and is located at a position facing screen 2. Electron gun 6 is arranged in neck 5. Deflection yoke 7 is arranged on the outer surface of tube 1 between funnel 4 and neck 5. Auxiliary supplement yoke 14 is arranged on the neck 5 side of deflection yoke 7. Conductive layers 11 and 12 are formed, respectively, on the inner and outer surfaces of funnel 5. Anode button 13 is arranged on part of funnel 4. An external anode voltage is supplied to screen 2, mask 9, layer 11 and the last stage electrode of gun 6 through button 13.

Figure 2:
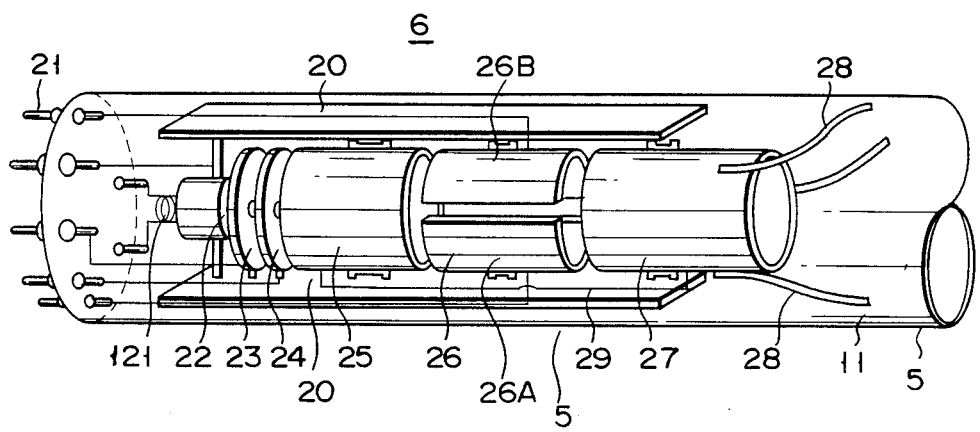
FIG. 2 is a perspective view schematically showing the structure of an electron gun in FIG. 1.

Gun 6 has a plurality of electrodes (to be described in detail later). As shown in FIG. 2, the plurality of electrodes are supported by two insulating support members 20 and are fixed to stem pins 21. These electrodes are thus sealed in neck 5.

The electrodes of gun 6 includes a cathode 22 with heater 121 for generating a single electron beam 15, and first, second, third, fourth, and fifth grids 23, 24, 25, 26, and 27 for controlling, accelerating and converging the electron beam from cathode 22. Grids 23 and 24 are electrode plates arranged near each other. Grid 25 is a cylindrical electrode located near grid 24. Grid 27 is a cylindrical electrode spaced apart from the third grid by a predetermined distance. Spacers 28 are mounted on the outer wall surface of grid 27 and are in contact with layer 11. Anode high voltage Eb of about 25 kV to 30 kV is applied to grid 27. Grids 25 and 27 are connected to connector 29. Two electrodes 26A and 26B of grid 26 and other electrodes are connected to stem pins 21, and a predetermined and relatively low external voltage is applied thereto. Deflection yoke 7 is provided with two pairs of coils for deflecting the electron beams in the horizontal (X) and vertical (Y) directions. Auxiliary supplement yoke 14 is provided with a pair of coils for slightly deflecting the electron beam along the vertical direction.

With the above electrode arrangement, beam 15 from cathode 22 is controlled by cathode 22 and grids 23 and 24, accelerated and converged by grids 25, 26, and 27, and caused to land on the screen. When beam 15 passes the fourth grid 26, it is electrostatically deflected by electrodes 26A and 26B in a predetermined cycle and subjected to a first small deflection having two stages. Therefore, including the case where it is not subjected to the first small deflection, the electron beam is deflected at three stages, thus providing three apparent electron beams 15, 16, and 17 on the major deflection plane.

These three electron beams are incident on the slit apertures of shadow mask 9 at predetermined angular positions and caused to land on the phosphor stripes, arranged on the screen corresponding to the incident angles, and the phosphors emit light rays. The three electron beams are deflected by deflection yoke 7 toward the front surface of the screen, and the screen is scanned with the electron beams.

At this time, distance Sg between each two adjacent electron beams is determined by the small deflection by the fourth grid 26. In theory, distance Sg can be arbitrarily decreased. In practice, however, when distance Sg is excessively decreased, distance Q between mask 9 and screen 2 must be greatly increased in accordance with the fundamental principles of shadow mask color cathode ray tubes. Therefore, distance Sg must be set within a practical range. When distance Sg is small on the plane of deflection, the strength of magnetic fluxes acting on the three electron beams and deflection distortions for the three electron beams can be reduced. Three good beam spots can be formed even at the periphery of the screen.

When three electron beams with small distance Sg are accurately converged at the center of the screen and deflected and scanned by yoke 7 throughout the screen, rasters with high convergence can be provided.

In the color cathode ray tube of the present invention, beams 15, 16, and 17 are switched in three stages within a short period of time during deflection and scanning and are caused to land at separate positions on the screen. This is substantially the same as in conventional cathode ray tubes having three electron guns, wherein convergence is very poor. As a result, in this uncorrected state the cathode ray tube cannot be put to practical use. The electron beams are slightly deflected in sequence in units of apertures of the shadow mask during one horizontal deflection period. In order to change colors, the signal frequencies for small deflection must be excessively increased, thus presenting difficulties in practical applications.

In order to solve the problem described above, the cycle of the first small deflection is synchronized with the cycle of one horizontal deflection scanning line to prevent an increase in frequency of a small deflection switching signal. Along with this, the respective color video signals with time differences are supplied to the electron gun. Furthermore, the second small deflection is applied to the electron beams by the coils of yoke 14 along the vertical direction, thereby correcting the convergence.

The convergence correction scheme will be described with reference to FIGS. 3, 4, 5A, 5B, 5C, 5D, and 5E.

Figure 3:
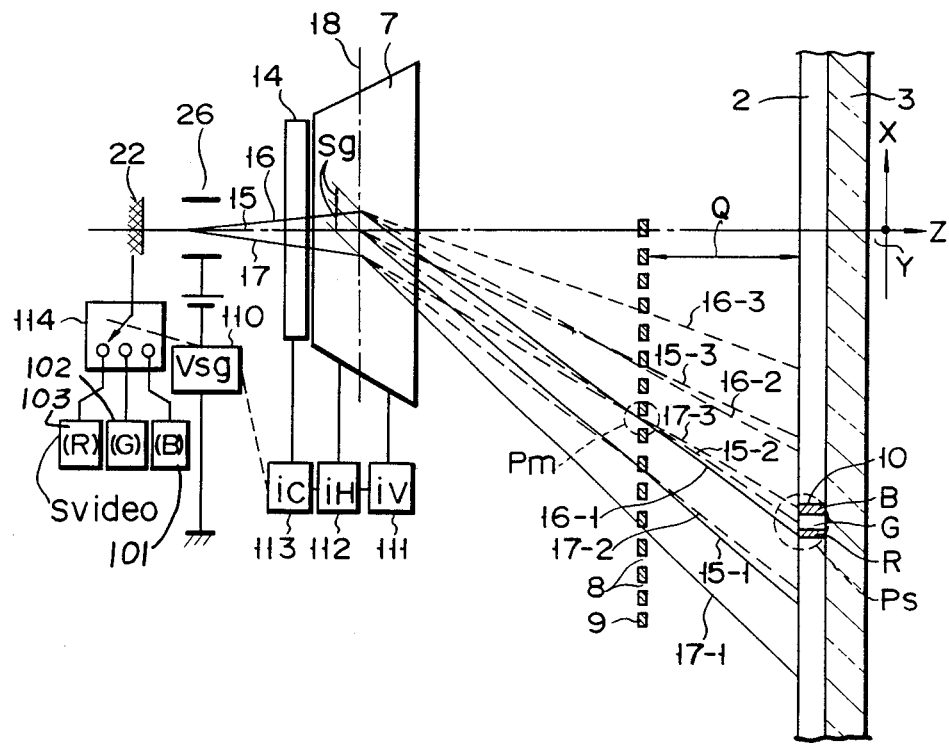
FIG. 3 shows trajectories of electron beams in the color cathode ray tube of FIG. 1.

As shown in FIG. 3, video signals Svideo are applied from signal sources 101, 102, and 103 to cathode 22 of gun 6. Small deflection voltage Vsg is applied from voltage source 110 to the fourth grid 26 to provide the first small deflection. Horizontal and vertical deflection currents iH and iV are supplied from current sources 111 and 112 to the horizontal and vertical deflection coils of yoke 7, respectively. Convergence correction current iC is supplied from current source 113 to the coils of yoke 14 to provide the second small deflection. Current iV has a saw-tooth wave the period of which is given by predetermined time Tv, as shown in FIG. 5A. This current is supplied to the vertical deflection coils to deflect and scan the electron beam in the vertical direction. As shown in FIG. 5B, current iH has a saw-tooth wave the period of which is given by time Th, sufficiently shorter than time Tv. This current is supplied to the horizontal deflection coils to deflect and scan the electron beam in the horizontal direction. First small deflection voltage Vsg having a rectangular wave is applied to the fourth grid 26, as shown in FIG. 5C. In synchronism with voltage Vsg, red, green, and blue video signals Svideo(R), Svideo(G), and Svideo(B) are sequentially applied to the cathode by switching device 114, as shown in FIG. 5D.

Figure 4:
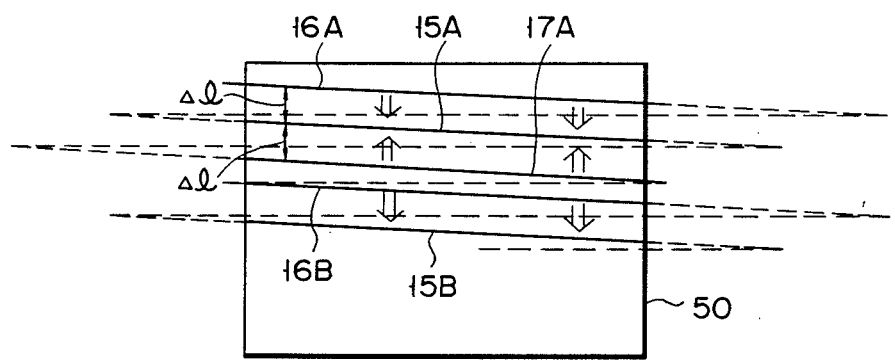
FIG. 4 shows trajectories of electron beams on a screen shown in FIG. 3.

As shown in FIG. 4, first scanning line 16A is scanned with the electron beam during the first horizontal deflection to reproduce the red video signal. Subsequently, second scanning line 15A is scanned with the electron beam during the second horizontal deflection to reproduce the green video signal. Finally, third scanning line 17A is scanned with the electron beam during the third horizontal deflection to reproduce the blue video signal. Thus, the red, green and blue video signals are sequentially scanned while the vertical deflection signal iV is continuously changing. Since during the horizontal deflection operation the electron beams are deflected in the vertical direction a vertical convergence error occurs, e.g., (scanning line 16A, 15A and 17A are parallel-shifted downward by Δl during one horizontal scanning period if the deflection magnetic field is left uncorrected. The value of Δl cannot be ignored. For example, in a 20" cathode ray tube employing the NTSC scheme, Δl is about 1 mm. Compared with currently commercially available CRTs, such an uncorrected cathode ray tube cannot be put to practical use.

In the embodiment of the present invention, the second small deflection is generated when a current iC is supplied to the coils of yoke 14 in response to the horizontal deflection signal iH, as shown in FIG. 5E, and thus the three electron beams can meet each other on screen 2. For example, when the electron beam is subjected to the first horizontal deflection, a current having a high level is supplied to the supplement coils 14 so as to deflect the beam downward by Δl. The same scanning line as line 15A which will be secondly scanned with the beam while a current having a reference level is supplied to the supplement coils 14, is scanned with the electron beam, as shown in FIG. 4. When the electron beam is subjected to the second horizontal deflection, a current having reference level is supplied to the supplement coils 14, as shown in FIG. 5E. Area 15A is scanned with the electron beam. When the electron beam is subjected to the third horizontal deflection, a current having a low level is supplied to the supplement coils 14 to deflect the beam upward by Δl, as shown in FIG. 5E. The same area as area 15A which was scanned with the beam while reference current was supplied to the supplement coils 14, is scanned with the electron beam, as shown in FIG. 4.

In the above embodiment, current iC having a rectangular wave is supplied to the supplement coils 14, as shown in FIG. 5E. In this case, the electron beams separated on deflection plane 18 by the magnetic field of yoke 7 do not trace the same trajectory, resulting in so-called misconvergence in the conventional three-electron gun color cathode ray tube. In order to correct misconvergence, a correction current having a parabolic wave instead of a rectangular wave is preferably supplied to the coils of yoke 14.

In the color cathode ray tube described above, the electron beam is horizontally deflected three times to scan the area scanned by a single horizontal deflection in the conventional color cathode ray tube having three electron guns. Therefore, the horizontal deflection frequency can be tripled as compared with the conventional one. In the NTSC scheme, the horizontal deflection frequency is 15.75 kHz, and thus the horizontal deflection frequency of this embodiment is 47.25 kHz. Horizontal deflection at this frequency does not present any problems for present circuit and deflection yoke design techniques. Therefore, a high-performance cathode ray tube of shadow mask type can be obtained without any practical problems.

Referring to FIG. 4, frame 50 represents an effective screen area. Broken lines represent portions with no video signals. As can be seen from FIG. 4, even if the three electron beams are deflected horizontally by yoke 7 in the same manner, the deflection scanning ranges are different from each other and are parallel-shafted horizontally. This horizontal shift in the scanning ranges is a source of a horizontal convergence error. The effective screen area thus falls within the deflection scanning range of the three electron beams. The video signals corresponding to the landing positions must be applied to cathode 22 of gun 6 while the electron beams are directed within the effective area of the screen, or else the adverse effects of horizontal convergence error will prevent the landing positions of the respective video signals from being properly aligned.

In TV broadcasting, the video signals corresponding to the regions on screen 2 are continuously transmitted in synchronism with the horizontal and vertical deflection scanning. A video signal cannot be directly applied to cathode 22 in the state shown in FIG. 5D. The video signals are temporarily stored and necessary signals are read out at the required timings, thereby providing the wave of FIG. 5D.

The above operation will be described with reference with FIG. 3 together with FIG. 4 and FIGS. 5A to 5E.

In the first horizontal deflection scanning, at time T1 when duration t0 has elapsed, red electron beam 16-1 passes through one slit aperture Pm on the shadow mask along the horizontal direction and lands on the red phosphor stripe of dot trio Ps on the screen. This phosphor stripe corresponds to aperture Pm. In the second horizontal deflection scanning, green electron beam 15-1 is incident on a shadow mask point or a slit aperture deviating from aperture Pm in a direction opposite to the scanning direction at time t2 corresponding to time t1 when duration t0 has elapsed due to the horizontal convergence error. As is apparent from FIG. 4, the electron beams slightly deflected in three stages by the fourth grid 26 have different landing positions on the screen and the landing positions are spaced apart from each other by considerable distances.

By advancing a little horizontal deflection, green electron beam 15-2 passes through point Pm, shown in FIGS. 3 and 5B at time t3. Blue electron beam 17-1 in horizontal deflection, has a horizontal convergence error which is incident on a shadow mask point or a slit aperture deviating from aperture Pm in a direction opposite to the scanning direction at time T4 corresponding to time t1. The horizontal convergence error of beam 17-1 is also incident on a shadow mask point or a slit aperture deviating from aperture Pm in a direction opposite to the scanning direction at a time corresponding to time t3.

However, when horizontal deflection further progresses, blue electron beam 17-3 passes through point Pm at time t5. Thus, to correct the horizontal convergence error, the video signals of point Pm are given as follows if the red signal is defined as the reference signal. The red signal from source 103 is supplied to cathode 22 through switching device 114. The green video signal from source 102 is delayed by delay circuit 105 by $[t3-t1=TH+(t3-t2)]$, and the delayed signal is supplied to cathode 22 through switching device 114. The blue video signal from source 103 is delayed by delay circuit 104 by time $[t5-t1=TH+(t5-t4)]$, and the delayed signal is supplied to cathode 22 through switching device 114. As a result, accurate images can be reproduced and horizontal convergence error due to the magnetic field from the deflection yoke can be reduced. A good image with high convergence can be obtained on the front surface of the screen. At the same time, the electron lens diameter can be sufficiently large, irrespective of distance Sg, since only one electron gun is used. Furthermore, the spot size on the screen can be sufficiently reduced. As a result, an image with high resolution can be reproduced.

In the above embodiment, the fourth grid 26 can be divided into halves. The first small deflection is applied to the electron beam by the electrostatic defection of the fourth grid 26, and the second small deflection is applied to the electron beam by the supplement yoke 14 located at the electron gun side of the main deflection coils. However, the present invention is not limited to this arrangement. The small deflection can be made by an electrostatic deflection plate added at the screen side of the fifth grid 27. Alternatively, the electron beam may be electromagnetically deflected by coils arranged around the neck just as in the second small deflection.

Furthermore, the first and second small deflections may be achieved by two pairs of coils located at the same position on the tube axis (Z axis) and having the same structure as the main deflection coils. Alternatively, the first and second small deflections can be provided by a single deflection means.

Another embodiment of the present invention will be described with reference to FIGS. 6 and 7.

Figure 6A:
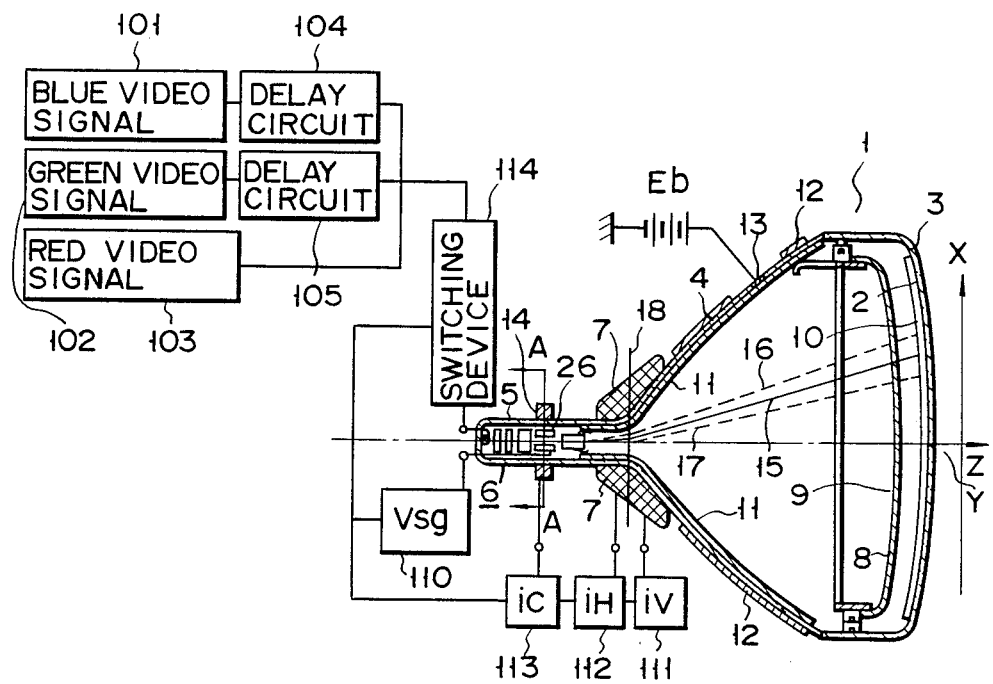
FIG. 6A is a schematic view of a color cathode ray tube according to another embodiment of the present invention.
Figure 6B:
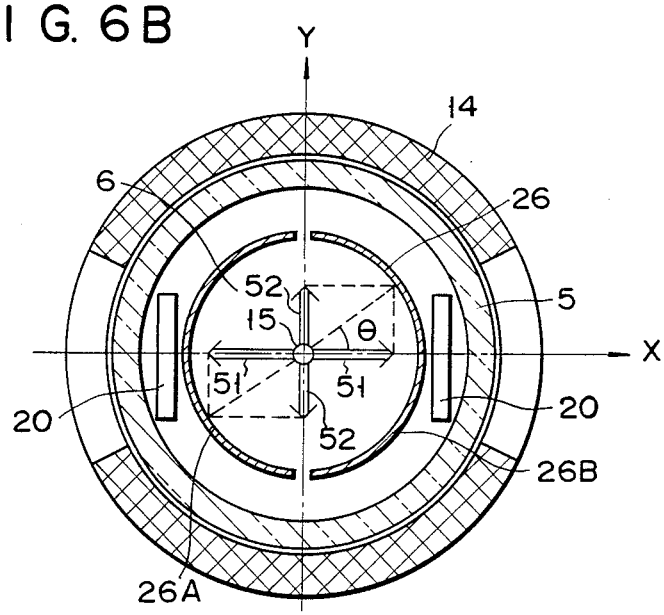
FIG. 6B is a sectional view of the color cathode ray tube in FIG. 6A taken along the line A—A thereof.

In the cathode ray tube of FIG. 6A, the electron beam is subjected to first and second small deflections at the same position along the tube axis (Z axis). FIG. 6B is a sectional view of the cathode ray tube of FIG. 6A taken along the line A—A in FIG. 6A, showing directions of forces acting on the electron beams in the small deflections. Referring to FIG. 6A, the structure of electron gun 6 and supplement yoke 14 are the same as in the first embodiment. However, yoke 14 is located at the position of split grid 26 of gun 6 on the tube axis (Z axis).

As shown in FIG. 6B, first deflection force 51 acts on beam 15 along the X direction by means of the split fourth grid 26. Second deflection force 52 acts on beam 15 by means of the supplement yoke 14, thereby achieving the same effect as in the previous embodiment. In this embodiment, however sensitivity of the second deflections is higher than in the previous embodiment.

FIG. 7A shows a cathode ray tube wherein first and second small deflections are performed by a single deflecting means, and FIG. 7B shows directions of forces acting on the electron beam by means of an auxiliary deflection device in the cathode ray tube of FIG. 7A. The same reference numerals in FIGS. 7A and 7B denote the same parts as in the previous embodiments, except for the structure of electron gun 6 and a supplement yoke, and a detailed description thereof will be omitted. Electron gun 6 includes electrodes 126A and 126B constituting fourth grid 126. Unlike in the first embodiment, electrodes 126A and 126B are arranged at predetermined angle $\theta$ with respect to the X-axis, as shown in FIG. 7B. In this embodiment, a supplement yoke need not be arranged.

In the embodiment of FIGS. 7A and 7B, a deflection force acts on beam 15 along the $\theta$-axis, as shown in FIG. 7B. Small deflection voltage $V(sg+c)$ is applied to grid 126 such that force 53 will substantially equal the combined forces of first and second deflection forces 51 and 52.

Beam 15 behaves in the same manner as when it is subjected to the first and second small deflections of FIG. 6B. As a result, high color purity and good convergence can be achieved.

In the above embodiment, a unipotential electron gun is used as the electron gun. However, a bipotential electron gun or a combination of unipotential and bipotential electron guns or an electron gun of another type may be used. In the above embodiment, the three electron beams are horizontally arranged in a line. The present invention, however, is not limited to this arrangement. The electron beam can be disposed to arrange the electron beams in a delta shape. Furthermore, instead of three states, the electron beam can be deflected in four or more stages.

In the above embodiment, the horizontal deflection current wave is a simple saw-tooth wave. However, it is possible to accelerate the three horizontal deflection stages to provide a short gap between these and the following stages.

When the three horizontal deflection stages are repeated in a more short interval, the vertical convergence correction current can be reduced.

the above embodiments each exemplify a color cathode ray tube with one electron gun for one screen. However, the present invention is not limited to a single gun arrangement, but can also be applied to multi-gun cathode ray tubes by dividing the screen, as described in Japanese Utility Model Disclosure No. 47-9349, Japanese Utility Model Publication No. 39-25641, and Japanese Patent Publication No. 42-4928.

In the above embodiments, the blue and green video signals are delayed from the red video signal as a reference signal. However, the present invention can use as a reference signal any one of the three. Furthermore, if a system which temporarily stores video signals in a memory element such as a frame memory is employed, delay circuits need not be arranged to provide proper time differences between the respective video signals in the read mode.

In the above embodiments, the three video signals are relatively delayed to correct for horizontal convergence error. However, as described in U.S. Pat. No. 2,764,628, the relative relationship between the video signal and the horizontal component of the deflection signal can be adjusted, thus modulating the phase of the horizontal deflection signal.

Figures 8A, 8B, 8C, 8D, 8E:
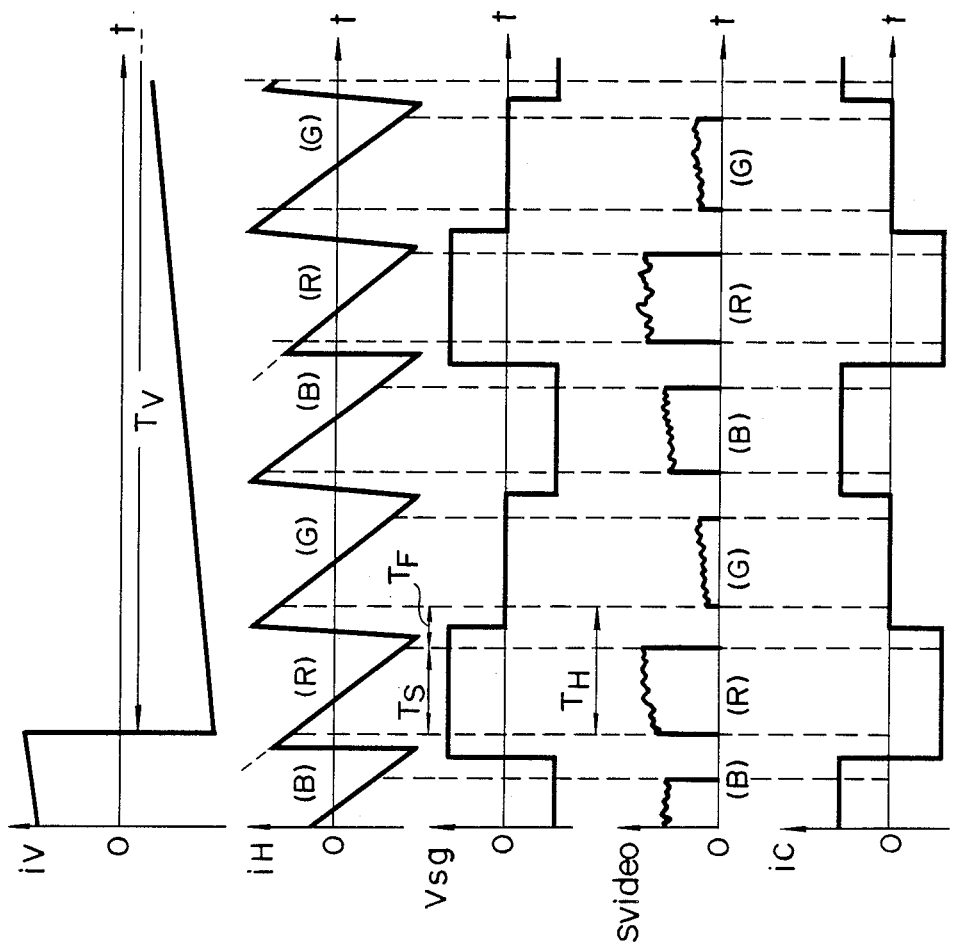
FIGS. 8A to 8E are timing charts of signals supplied to the respective components of the color cathode ray tube of FIG. 6.

This third embodiment will be described with reference to FIGS. 8A to 8E. FIGS. 8A to 8E are timing charts corresponding to FIGS. 5A to 5E of the signals in the color cathode ray tube described with reference to FIGS. 1 to 3. Although the horizontal deflection signal iH in FIG. 8B has a polarity opposite to the embodiment shown in FIG. 5B, indicating an opposite scanning direction, the polarity in FIG. 8B can be modified to be the same as in FIG. 5B. Referring to FIG. 8A, current iV is supplied to yoke 7 during predetermined time Tv, and the electron beam is deflected and scanned in the vertical direction.

In synchronism with this vertical deflection and scanning, current iH having a saw-tooth waveform is supplied for a period shorter than time $T_H$, so that the beam is scanned once in the horizontal direction for time $T_S$ across frame 50. After time $T_F$, the electron beam is canned again in the horizontal direction for time Ts. Time Tf includes the horizontal flyback time and is provided to synchronize the video signal with the horizontal deflection. Thus, this phase modulation of the horizontal deflection signal iH corrects the horizontal convergence error, ensuring the starting point of each video signal is coincident in the horizontal direction.

In synchronism with the horizontal deflection, as shown in FIG. 8C, voltage Vsg is applied to the fourth grid 26. In response to voltage Vsg, red, green, and blue video signals Svideo (R), Svideo(G), and Svideo(B) are sequentially applied to the cathode for time $T_H$, as shown in FIG. 8D. Referring to FIG. 4, the red signal is reproduced on scanning line 16A in the first horizontal deflection. The green signal is preproduced on scanning line 15A in the second horizontal deflection. Finally, the blue signal is reproduced on the scanning line 17A in the third horizontal deflection. In this case, the beams are also deflected in the vertical direction. If the deflection magnetic field is uncorrected, scanning lines 16A, 16B, and 16C subjected to red, blue, and green reproduction cycles in the first, second, and third horizontal deflections are parallel-shifted downward by $\Delta l$. However, as shown in FIG. 8E, since current iC is supplied to the correction coil in synchronism with the horizontal deflection, the scanning lines with three electron beams coincide with each other. For example, when the electron beam 16A is subjected to the first horizontal deflection for the red signal, a current having a low level is supplied to the supplement coil to slightly deflect the beam downward by $\Delta l$, as shown in FIG. 5E. When scanning line 15A is scanned in the second horizontal deflection for the green signal, a current having reference level is supplied to the supplement coils, as shown in FIG. 5E. Furthermore, when the electron beam is subjected to the third horizontal deflection as scanning line 17A for the blue signal, a current having a high level is supplied to the supplement coil to slightly deflect the beam upward by $\Delta l$, as shown in FIG. 8E. Note that the same electron beam sequentially generates scanning lines 16A, 15A and 17A in FIG. 4.

According to the present invention, the electrode opening, i.e., the electron lens diameter can be increased irrespective of the distance between each two adjacent beams of a plurality of electron beams formed on the deflection plane when one electron gun is used. Therefore, a high-resolution image can be obtained. At the same time, the distance between the adjacent electron beams can be arbitrarily reduced irrespective of the electron lens diameter. Time differences are simultaneously provided to the video signals, thus obtaining a high quality image with good convergence. Furthermore, since the beam distance can be decreased, the axis portion of the deflection magnetic field can be used. The imbalance of the deflection magnetic field acting on the plurality of electron beams can also be decreased, thereby obtaining a good beam spot even in portion of the screen. Furthermore, since color switching is not based on the vertical deflection period, screen flicker can be eliminated. Color switching has the same period as horizontal deflection, and unlike in chromatron tubes the switching frequency can be kept low, thus providing very practical circuits.

What is claimed is:

1. A color cathode ray apparatus comprising:
   means for generating a vertical deflecting signal having first predetermined duration, Tv;
   means for generating horizontal deflecting signals during the first predetermined duration Tv, each corresponding to one scanning line and having first, second and third horizontal deflecting signal components, each of the components having a second duration Th within the first duration Tv;

means for sequentially generating first, second and third video signal components corresponding to the one scanning line in synchronism with the horizontal deflecting signal components within a third predetermined period equal to three times duration Th, the third period therefore having a duration 3×Th, each video signal being generated within duration Th;

means for applying predetermined first and second time delays to the second and third video signal components, respectively, the first time delay being shorter than the second time delay;

means for generating first, second and third beam switching signals in synchronism with the horizontal deflecting signal components;

means for generating fourth, fifth and sixth beam switching signals in synchronism with the horizontal deflecting signal components;

a vacuum envelope provided with a faceplate;

a phosphor screen formed on the faceplate and including a plurality of groups of phosphor elements, each group of phosphor elements capable of emitting different color light rays;

an electron gun, provided in the vacuum envelope and sequentially energized by the first video signal component and the delayed second and third video signal components, for emitting a single electron beam and focusing the electron beam on the phosphor screen;

first auxiliary deflecting means for stepwise deflecting the single electron beam in response to the first, second and third beam switching signals to produce first, second and third apparent beams corresponding to the first, second and third video signal components, which are sequentially directed in different directions;

second auxiliary deflecting means for stepwise deflecting the first, second and third apparent beams in response to the fourth, fifth and sixth beam switching signals to sequentially direct the first, second and third apparent beams to a scanning line on the screen;

a shadow mask facing the phosphor screen in the envelope and having apertures arranged in a predetermined array, each aperture causing the apparent beams to impinge on phosphor elements corresponding to said apparent beams, respectively, so that said different color light rays are emitted from the phosphor screen; and deflecting means, energized by the horizontal and vertical deflecting signals, for deflecting the first, second and third apparent beams in horizontal and vertical directions, the scanning line on the screen being scanned with each of the first, second and third apparent beams during a respective duration Th and sequentially scanned with the first, second and third apparent beams during the third predetermined period 3×Th.

2. A color cathode ray apparatus according to claim 1, wherein the first, second and third video signal components are red, green and blue signal components, respectively.

3. A color cathode ray apparatus according to claim 1, wherein said first auxiliary deflecting means comprises a pair of electrodes facing each other and disposed in the envelope, to which the first, second and third switching signals are applied, the single electron beam being divided into the first, second and third apparent beams when the single electron beam passes through a gap between the electrodes and the first, second and third switching signals are applied to the electrodes.

4. A color cathode ray apparatus according to claim 1, wherein said second auxiliary deflecting means comprises a supplemental coil disposed around the envelope, to which the fourth fifth and sixth beam switching signals are supplied.

5. A color cathode ray apparatus according to claim 1, further comprising means for supplying the first video signal component and the delayed second and third video signal components to said electron gun in accordance with the respective horizontal deflecting signals in order to correct a horizontal convergence error.

6. A color cathode ray apparatus according to claim 1, wherein said first auxiliary deflecting means deflects the single electron beam in a horizontal direction.

7. A color cathode ray apparatus according to claim 1, wherein said second auxiliary deflecting means deflects the first, second and third apparent beams in a vertical direction.

8. A color cathode ray apparatus comprising:

means for generating a vertical deflecting signal having first predetermined duration, Tv;

means for sequentially generating first, second and third horizontal deflecting signals, each having a second duration, Th, during the first predetermined duration Tv;

means for generating first, second and third video signals corresponding to one scanning line in synchronism with the horizontal deflecting signals within a third predetermined period equal to three times duration Th, the third period therefore having a duration 3×Th, each video signal being generated within duration Th;

means for applying predetermined first and second time delays to the second and third video signals, respectively, the first time delay being shorter than the second time delay;

means for generating first, second and third beam switching signals in synchronism with the first, second and third horizontal deflecting signals;

a vacuum envelope provided with a faceplate;

a phosphor screen formed on the faceplate and including a plurality of groups of phosphor elements, each group of phosphor elements capable of emitting different color light rays;

an electron gun, provided sin the vacuum envelope and sequentially energized by the first video signal and the delayed second and third video signals, for emitting a single electron beam and focusing the electron beam on the phosphor screen;

auxiliary deflecting means for stepwise deflecting the single electron beam in response to the first, second and third switching signals in a predetermined direction other than horizontal or vertical directions to produce first, second and third apparent beams corresponding to the first, second and third video signals, which are sequentially directed to a scanning line on the screen;

a shadow mask facing the phosphor screen in the envelope and having apertures arranged in a predetermined array, each aperture causing the apparent beams to impinge on phosphor elements corresponding to said apparent beams, respectively, so that said different color light rays are emitted from the phosphor screen; and deflecting means, energized by the horizontal and vertical deflecting signals, for deflecting the first, second and third apparent beams in horizontal and vertical directions, the scanning line on the screen being scanned with each of the first, second and third apparent beams during a respective duration Th and sequentially scanned with the first, second and third apparent beams during the third predetermined period $3 \times Th$.

9. A color cathode ray apparatus according to claim 8, wherein the first, second and third video signals are red, green and blue video signals, respectively.

10. A color cathode ray apparatus according to claim 8, wherein said auxiliary deflecting means comprises a pair of electrodes facing each other and disposed in the envelope, to which the first, second and third switching signals are applied, the single electron beam being divided into the first, second and third apparent beams when the single electron beam passes through a gap between the electrodes and the first, second and third switching signals are applied to the electrodes.

11. A color cathode ray apparatus according to claim 8, further comprising means for supplying the first video signal and the delayed second and third video signals to said electron gun in accordance with the respective horizontal deflecting signals in order to correct a horizontal convergence error.

12. A color cathode ray apparats comprising:
means for generating a vertical deflecting signal having first predetermined duration, Tv;
means for generating first, second and third horizontal deflecting signals, each having a second duration, Th, during the first duration Tv, the horizontal deflecting signal generating means including means for phase modulating the first and third horizontal deflecting signals;
means for generating first, second and third video signals corresponding to one scanning line in synchronism with the horizontal deflecting signals within a third predetermined period equal to three times duration Th, the third period therefore having a duration $3 \times Th$, each video signal being generated within duration Th;
means for generating first, second and third beam switching signals in synchronism with the first, second and third horizontal deflecting signals;
means for generating fourth, fifth and sixth beam switching signals in synchronism with the horizontal deflecting signals;
a vacuum envelope provided with a faceplate;
a phosphor screen formed on the faceplate and including a plurality of groups of phosphor elements, each group of phosphor elements capable of emitting different color light rays;
an electron gun, provided in the vacuum envelope and sequentially energized by the first, second and third video signals, for emitting a single electron beam and focusing the electron beam on the phosphor screen;
first auxiliary deflecting means for stepwise deflecting the single electron beam in response to the first, second and third switching signals to produce first, second and third apparent beams corresponding to the first, second and third video signals, which are sequentially directed in different directions;
second auxiliary deflecting means for stepwise deflecting the first, second and third apparent beams in response to the fourth, fifth and sixth beams switching signals to sequentially direct the first, second and third apparent beams to a scanning line of the screen;
a shadow mask facing the phosphor screen in the envelope and having apertures arranged in a predetermined array, each aperture causing the apparent beams to impinge on phosphor elements corresponding to said apparent beams, respectively, so that said different color light rays are emitted from the phosphor screen; and
deflecting means, energized by the horizontal and vertical deflecting signals, for deflecting the first, second and third apparent beams in horizontal and vertical directions, the scanning line on the screen being scanned with each of the first, second and third apparent beams during a respective duration Th and sequentially scanned with the first, second and third apparent beams during the third predetermined period $3 \times Th$.

13. A color cathode ray apparatus according to claim 12, wherein the first, second and third video signals are red, blue and green video signals, respectively.

14. A color cathode ray apparatus according to claim 12, wherein said first auxiliary deflecting means comprises a pair of electrodes facing each other and disposed in the envelope, to which the first, second and third switching signals are applied, the single electron beam being divided into the first, second and third apparent beams when the single electron beam passes through a gap between the electrodes and the first, second and third switching signals are applied to the electrodes.

15. A color cathode ray apparatus according to claim 12, wherein said second auxiliary deflecting means comprises a supplemental coil disposed around the envelope, to which the fourth, fifth and sixth beam switching signals are supplied.

16. A color cathode ray apparatus according to claim 12, wherein said first auxiliary deflecting means deflects the single electron beam in a horizontal direction.

17. A color cathode ray apparatus according to claim 12, wherein said second auxiliary deflecting means deflects the first, second and third apparent beams in a vertical direction.

18. A color cathode ray apparatus comprising:
means for generating a vertical deflecting signal having first predetermined duration, Tv;
means for generating first, second and third horizontal deflecting signals, each having a second duration, Th, during the first duration Tv, the horizontal deflecting signal generating means including means for phase modulating the first and third horizontal deflecting signals;
means for generating first, second and third video signals corresponding to one scanning line in synchronism with the horizontal deflecting signals within a third predetermined period equal to three times duration Th, the third period therefore having a duration $3 \times Th$, each video signal being generated within duration Th;
means for generating first, second and third beam switching signals in synchronism with the first, second and third horizontal deflecting signals;

means for generating fourth, fifth and sixth beam switching signals in synchronism with the horizontal deflecting signals;

a vacuum envelope provided with a faceplate;

a phosphor screen formed on the faceplate and including a plurality of groups of phosphor elements, each group of phosphor elements capable of emitting different color light rays;

an electron gun, provided in the vacuum envelope and sequentially energized by the first, second and third video signals, for emitting a single electron beam and focusing the electron beam on the phosphor screen;

first auxiliary deflecting means for stepwise deflecting the single electron beam in response to the first, second and third switching signals to produce first, second and third apparent beams corresponding to the first second and third video signals, which are sequentially directed in different directions;

second auxiliary deflecting means for stepwise deflecting the first, second and third apparent beams in response to the fourth, fifth and sixth beam switching signals to sequentially direct the first, second and third apparent beams to a scanning line of the screen;

a shadow mask facing the phosphor screen in the envelope and having apertures arranged in a predetermined array, each aperture causing the apparent beams to impinge on phosphor elements corresponding to said apparent beams, respectively, so that said different color light rays are emitted from the phosphor screen; and deflecting means, energized by the horizontal and vertical deflecting signals, for deflecting the first, second and third apparent beams in horizontal and vertical directions, the scanning line on the screen being scanned with each of the first, second and third apparent beams during a respective duration Th and sequentially scanned with the first, second and third apparent beams during the third predetermined period $3 \times Th$.

19. A color cathode ray apparatus according to claim 18, wherein the first, second and third video signals are red, blue and green video signals, respectively.

20. A color cathode ray apparatus according to claim 18, wherein said first auxiliary deflecting means comprises a pair of electrodes facing each other and disposed in the envelope, to which the first, second and third switching signals are applied, the single electron beam being divided into the first, second and third apparent beams when the single electron beam passes through a gap between the electrodes and the first, second and third switching signals are applied to the electrodes.

21. A color cathode ray apparatus comprising:

a screen defining a plurality of scanning lines;

means for generating a small deflection signal having first, second and third signal levels, said small deflection signal being sequentially changed from the first signal level to the second signal level, from the second signal level to the third signal level, and from the third signal level to the first signal level;

means for generating a vertical deflection signal;

means for generating horizontal deflection signals, each horizontal deflection signal corresponding to one of the color scanning lines and including first, second and third horizontal signal components sequentially generated in accordance with the signal levels of the small deflection signal;

means for sequentially generating first, second and third color video signals in accordance with the respective signal levels of the small deflection signal;

means for emitting a single electron beam sequentially modulated in accordance with the first, second and third color video signals;

means for applying a first and second opposite small deflection to the single electron beam in response to the small deflection signal, the single electron beam being split into first, second and third apparent electron beams which correspond to the first, second and third video signals, respectively; and deflecting means, responsive to said horizontal and vertical deflection signals, for deflecting the first, second and third apparent electron beams in vertical and horizontal directions, the first, second and third apparent electron beams being deflected in the horizontal direction and scanning the same scanning lines on said screen in accordance with the first, second and third horizontal deflection signal components.

22. An apparatus as recited in claim 21, wherein said video signal generating means further includes means for adding a first predetermined delay to said second color video signal and a second predetermined delay to said third color video signal, thereby delaying the sequential input of said second and third color video signals to said electron gun.

23. An apparatus as recited in claim 22, wherein the first, second and third horizontal signal components of the horizontal deflection signal are periodically generated and synchronized with the first, second and third levels of said small deflection signal, respectively.

24. An apparatus as recited in claim 22, wherein:

said small deflection signal generating means generates a second small deflection signal having fourth, fifth and sixth signal levels, said second small deflection signal being sequentially changed from the fourth signal level to the fifth signal level, from the fifth signal level to the sixth signal level and from the sixth signal level to the fourth signal level; and said small deflection applying means comprises:

first applying means for applying said first small deflection in response to the first small deflection signal in one of the horizontal and vertical directions, said first applying means being disposed in said electron beam generating means, and second applying means for applying said second opposite small deflection in response to the second small deflection signal in the other of the horizontal and vertical direction, one of the first and second opposite small deflections correcting a vertical convergence error between said first, second and third apparent beams at said scanning line.

25. An apparatus as recited in claim 24, wherein one of said first and second applying means includes coils for generating magnetic fields which deflect the first, second and third electron beams.

26. An apparatus as recited in claim 24, wherein one of said first and second applying means includes a grid having first and second electrodes.

27. An apparatus as recited in claim 21, wherein said small deflection applying means comprises a grid having a first and second electrode, said grid being arranged at an angle with respect to the vertical direction.

28. An apparatus as recited in claim 21, wherein said small deflection applying means applies the small deflections in a direction inclined to the vertical direction at an angle.

29. An apparatus as recited in claim 21, wherein the horizontal deflection signal generating means includes means for phase modulating said horizontal deflection signal components in accordance with said first, second and third small deflection signals.

30. An apparatus as recited in claim 29, wherein said video signal generating means periodically generates the first, second and third video signals.

31. An apparatus as recited in claim 29, wherein said horizontal deflection signal component includes a duration having first period $T_S$ and a second period $T_F$, each of said first, second and third apparent beams being directed to each of said scanning lines during said first period $T_S$, said second period $T_F$ being modulated to correct said horizontal convergence error.

32. An apparatus as recited in claim 29, wherein:
said small deflection signal generating means generates a second small deflection signal having fourth, fifth and sixth signal levels, said second small deflection signal being sequentially changed from the fourth signal level to the fifth signal level, from the fifth signal level to the sixth signal level and from the sixth signal level to the fourth signal level; and
said small deflection applying means comprises:
first applying means for applying said first small deflections in response to the first small deflection signal in one of the horizontal and vertical directions, said first applying means being disposed in said electron gun, and
second applying means for applying said second opposite small deflections in response to the second small deflection signal in the other of the horizontal and vertical direction, one of the first and second small deflections correcting a vertical convergence error between said first, second and third apparent beams at said scanning line.

33. An apparatus as recited in claim 32, wherein one of said first and second applying means includes coils for generating magnetic fields which deflect the first, second and third electron beams.

34. An apparatus as recited in claim 32, wherein one of said first and second applying means includes a grid having first and second electrodes.

35. An apparatus as recited in claim 29, wherein said small deflection applying means comprises a grid having a first and second electrode, said grid being arranged at an angle with respect to the vertical direction.

36. An apparatus as recited in claim 29, wherein said small deflection applying means applies the small deflection in a direction inclined to the vertical direction at an angle.

37. A color cathode ray apparatus according to claim 18, wherein said first auxiliary deflecting means comprises a pair of electrodes facing each other, said pair of electrodes being disposed in the envelope and responsive to the first, second and third switching signals are applied, the single electron beam being divided into the first, second and third apparent beams when the respective first, second and third switching signals, to the electrodes and the single electron beam passes through a gap between the electrodes.

* * * * *